STANLEY WALSH
JOSHUA WALSH
INVENTORS

BY
H C Bierman

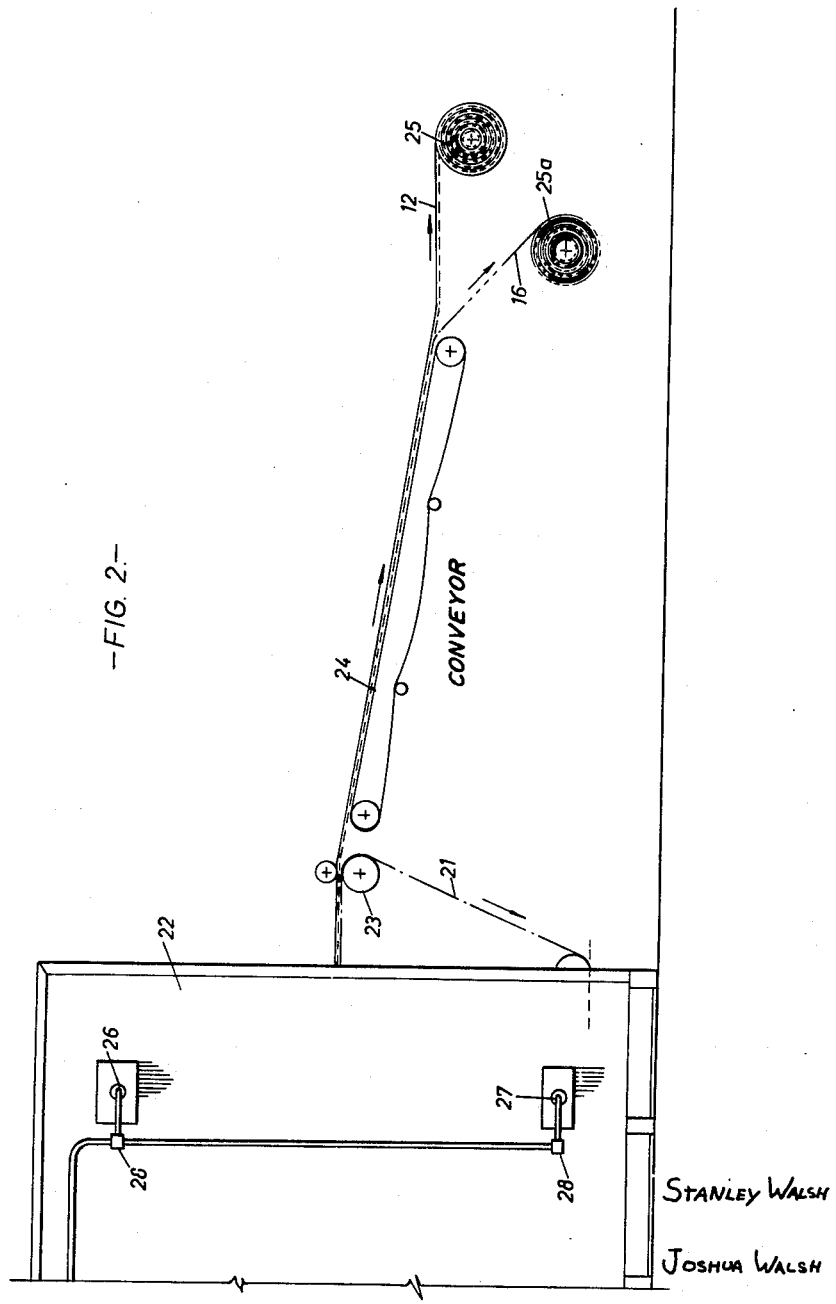

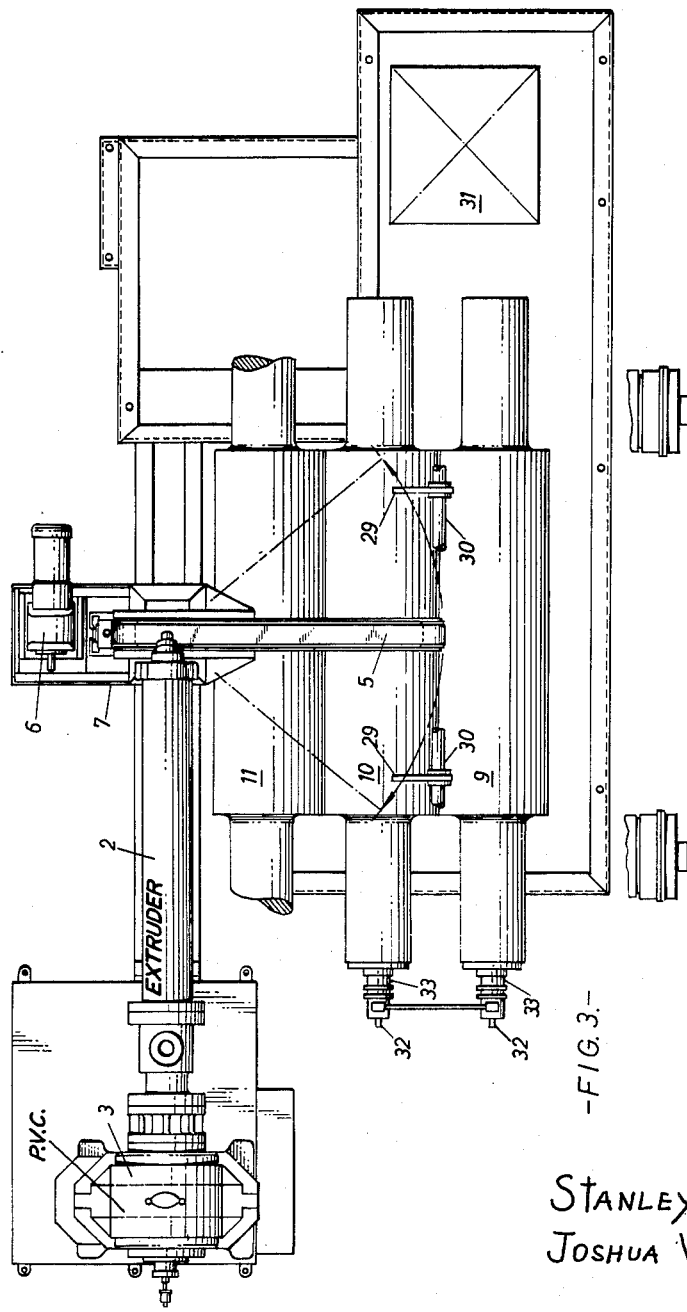

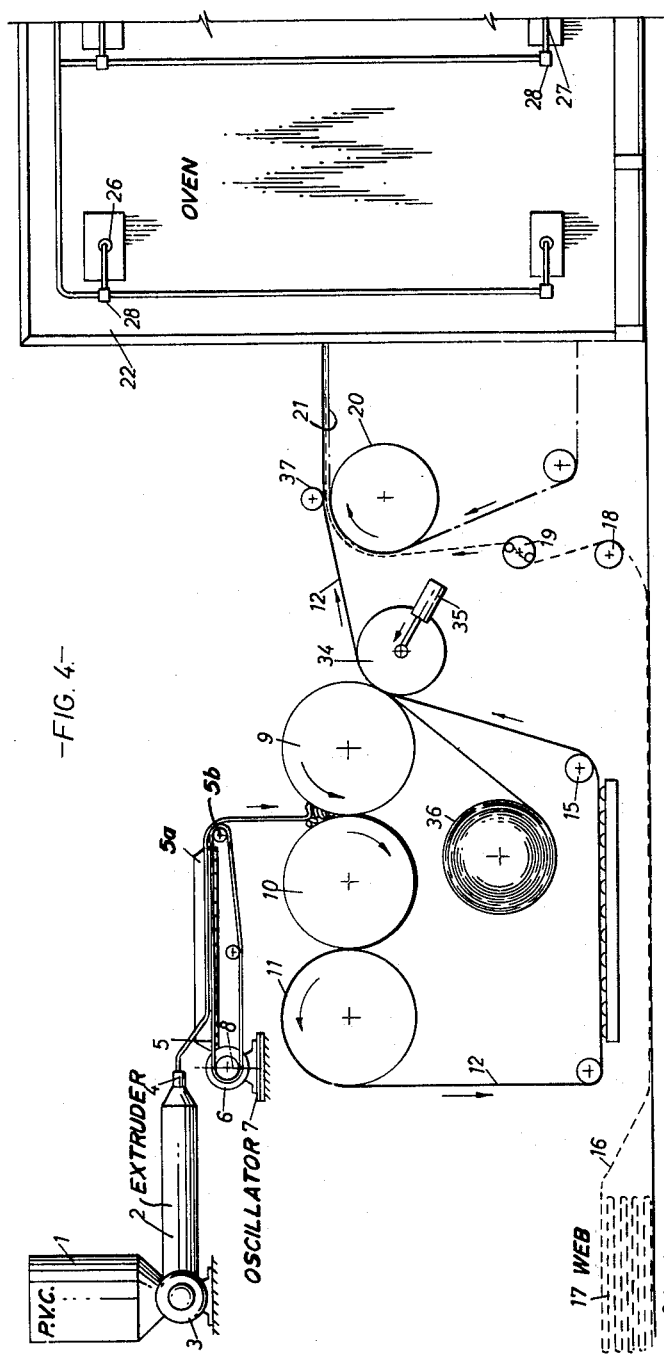

United States Patent Office 3,205,116
Patented Sept. 7, 1965

3,205,116
APPARATUS FOR MANUFACTURING
SYNTHETIC FOAMED SHEETS
Stanley Walsh, St. Annes, Lytham St. Annes, and Joshua Walsh, Great Harwood, Blackburn, England, assignors to Hardura Group Limited, Great Harwood, Blackburn, England, a British company
Filed Apr. 3, 1961, Ser. No. 100,083
Claims priority, application Great Britain, Apr. 5, 1960, 11,927/60; June 5, 1960, 20,942/60
8 Claims. (Cl. 156—500)

This invention relates to the manufacture of polyvinyl chloride and similar synthetic materials in foamed or blown form and in continuous sheets.

Foamed polyvinyl chloride sheets are already known but, hitherto, it has been difficult to produce these sheets economically and rapidly in continuous lengths. Proposals have in fact been made for the production of continuous lengths of foamed polyvinyl chloride sheet but these have not hitherto been commercially successful. The usual procedure adopted, therefore, has been to make short lengths of the foam sheet by first making a slab or block of the foamed material and then cutting it into slices or sheets.

It is the main object of the present invention to provide a process and apparatus for making polyvinyl chloride or like sheet foam which allows of a continuous run, producing an uninterrupted length of the sheet to any thickness up to say 0.75 inch or thereabouts, and to maintain such thickness substantially uniform throughout the length of the material. The invention makes possible the production of this continuous sheet foam either with or without a fabric or like backing.

It is a further object of the present invention to provide such continuous foamed sheet material with a hard-wearing top surface which may be in plain or multi-coloured form and may in fact incorporate a pattern or other display matter.

According to the invention, uncured p.v.c. (polyvinyl chloride) or material having similar properties in mobile paste or thick liquid form, and having a heat-activated chemical foaming agent dispersed therein is extrude into rod or other section on to a horizontal mill or calendar when it is worked between rollers and delivered as a continuous flat web of predetermined thickness, this web then being brought into contact with and laid on a web or carrier of textile material, paper or similar material, and the two webs passing through a curing oven, the length of the oven and the speed of traverse of the material therethrough being such as to effect the required foaming of the material by actuation of the said chemical foaming agent, and to give the required degree of curing to the p.v.c. or material.

It is found that by using a thick liquid or a mobile paste form of starting material, the foaming agent is more homogeneously distributed throughout the p.v.c. and, further, it is in a better physico-chemical form for effecting a rapid blowing action when the sheet is in the oven. The oven itself may be long or short, according to requirements but in all cases the foaming and curing is effected at a high temperature. A suitable curing temperature is 230–250° C. In the case of a long oven, the temperature may vary from zone to zone.

The nature of the support or carrier material may vary according to the ultimate form of sheet required, that is to say whether a backed sheet or an unbacked sheet is wanted. For some purposes, e.g. as an upholstery material, a backed sheet is desirable as this allows of a facing material laid on the top of the foam being welded through to the backing material on lines or spots or other design to give an ornamental appearance.

For backed materials the support or carrier may be for example of fine woven cotton material or of unwoven textile material or of Hessian or of any other textile, paper or other non-metallic web.

When an unbacked foamed sheet is required, the said support or carrier is of a material which will readily peel away from the foamed layer. Such a material may be a non-porous web, or a shiny-surfaced paper or may be a material such as Hessian having a rough fibrous surface.

The use of the hairy or fibrous surface of Hessian or similar textile material reduces the entry of the p.v.c. or material having similar properties into the interstices of the carrier and, further, it allows of an easy peeling off of the foamed material, even if some of the surface fibres or hairs of the textile carrier web are torn away with the p.v.c. sheet.

If the final product is required as a backed sheet of foam, the material leaving the oven is wound for storage. If, on the other hand, a non-backed foam sheet is required, the backing layer (selected as explained above) is peeled off the p.v.c. material and the two are wound separately. In either case, the hot material from the oven may pass under a smoothing roll which may be cooled so as to put a skin on the foam material along its whole length.

According to another feature of the invention, there is applied to the top surface of the unblown p.v.c. material, between the said horizontal mill or calender and the curing oven, a thin film of p.v.c. (supported or unsupported), plain or multicoloured and which becomes permanently united to the top surface of said material automatically during the blowing and curing of the latter, in said oven, and without requiring any intervening adhesive.

In the preferred modes of carrying out this feature of the invention a printed, stencilled or otherwise produced design and/or colouring matter is first applied to a separately-formed thin p.v.c. continuous film and it is this film which is laid upon the top surface of the unblown material and which, when the lamination is heated, becomes bonded to that surface simultaneously with the blowing of said sheet material. It is desirable that, before the two contacting sheets enter the oven, any pockets or bubbles of air between them should be eliminated and for this purpose the two laminations may be passed through a light nip between two rollers or under a light doctor blade, spreader or the like.

After the combined material emerges from the oven, where it has been blown and the colour and/or design has become fixed, a smooth upper surface can be given to it by passing it under and in contact with a chilling roller, for example a water-cooled roller. In some cases, however, a rough upper surface might be preferred, in which event the chilling of the material is omitted.

The improved resilient continuous sheeting according to this feature of the invention is suited to a great variety of uses, for example as a floor covering, a wall covering, for the manufacture of toilet bags, as an automobile trim and for many more uses where a washable, resilient moisture-proof decorative surface is required. The material is fire-resistant, acid resistant, and oil-and-grease resistant. It is also sound absorbing and therefore can be used for lining walls and other surfaces where sound insulation is required. Since it has a decorative surface, it can be used on the outer surface of a wall where both decoration and sound insulation are important.

The invention will now be described with reference to the accompanying drawings, wherein:

FIG. 2 is a similar side view of the exit end of the machine;

FIG. 3 is a lay-out plan of the extruding, milling and calendaring apparatus at the entrance end of the machine; and FIG. 4 is a view corresponding to FIG. 1 but showing a modified form of the invention for providing the said hard-wearing top layer.

Figure 1:
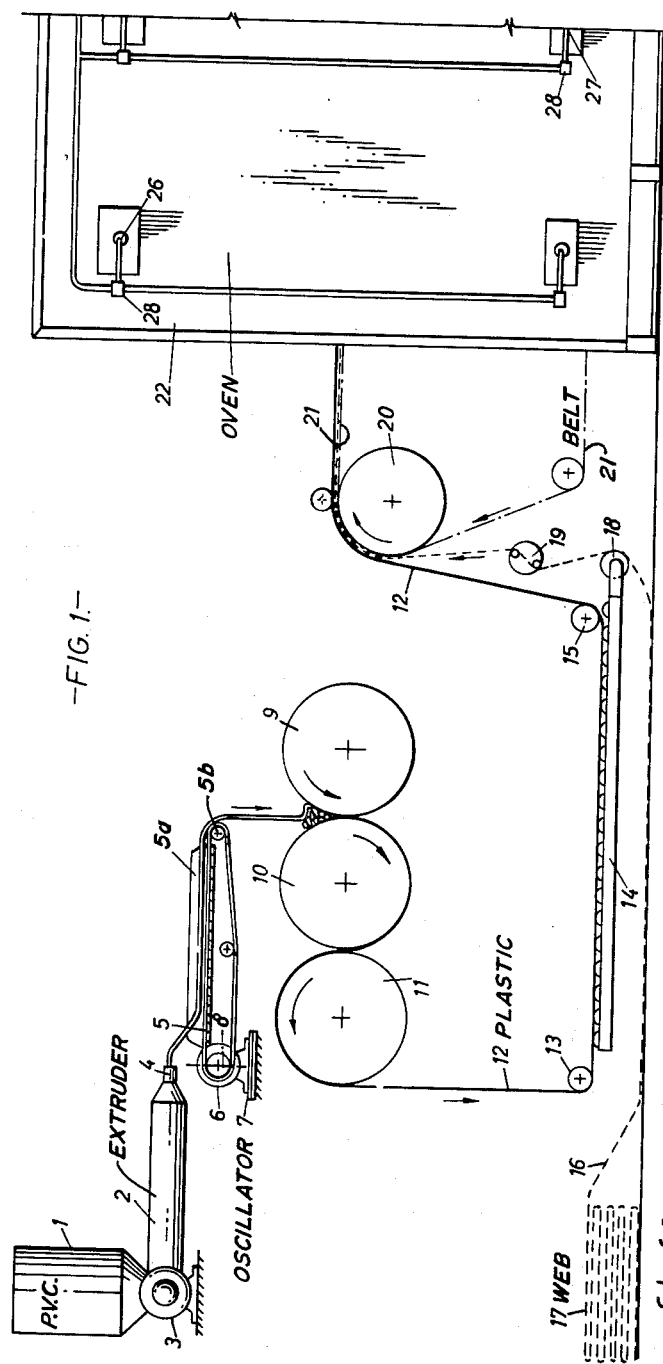
FIG. 1 is a diagrammatic side view of the entrance end of the machine.

Referring first to FIGS. 1–3, apparatus for carrying out the invention comprises a feed hopper 1 for the previously-prepared viscous or paste p.v.c. or like material in which has been incorporated a heat-responsive foaming agent (e.g. azo-dicarbonamide), and the material is fed from said hopper to a screw-type extruder 2, the screw of which is driven by a motor 3. The material is delivered by the extruder through a nozzle 4 in the form of a flexible plastic rod, and this falls on to a narrow conveyor band 5 lying between side walls 5ª and driven by a motor 6. This motor 6 and the framework which carries the conveyor band and its guide are mounted on an oscillatory support 7 so as to have a to-and-fro angular reciprocation about the vertical axis 8 and thereby causing the discharge end 5ᵇ of the conveyor 5 to traverse the nip between the rollers 9 and 10 of a three-roll horizontal mill or calender, the third roll 11 of the calender delivering the plastic material in the form of a sheet 12.

The mechanism for obtaining from the motor 6 a horizontal oscillatory motion for the conveyor mounting can be of any known kind, for example a crank motion or a reversing rack and pinion motion.

The plastic sheet 12 coming from the delivery roll 11 of the calender is passed below a guide roller 13, from whence it travels along a non-driven roller support 14 to a further guide roller 15 and on to the curing oven as described below.

A supply of the textile backing material 16 (for example a Hessian web) is provided, either in plated form as shown at 17 or in roll form, and this is allowed to travel freely along the ground below the said roller support 14 (there could be a similar support for the backing material if wanted) to a guide roller 18 then to a twitch-rail 19 for tensioning and smoothing purposes, and then upwards to become laminated with the plastic web 12, the sheet 12 and textile backing 16 being brought together at the periphery of a roll 20 around which travels a wire mesh endless belt 21. The said belt 21 traverses the curing oven 22 and, as it leaves the oven and passes over the roll 23 for return to the roll 20, the new-foamed material is taken from the belt 21 to an endless, downwardly-inclined conveyor 24 where it is allowed to cool and, at the bottom of that conveyor, it is reeled onto takeup roll 25 if the backing is to remain as a permanent backing for the foam or, if a non-backed foam sheet is wanted, the textile web 16 is peeled off at the lower end of conveyor 24 and wound separately onto takeup roll 25ª.

The oven 22 is a gas-heated oven (other heating means could be used) and is provided with top and bottom heaters 26, 27 at spaced intervals along its length, each such heater being provided with a control device 28 which may be pre-set so as to maintain a pre-selected temperature in the oven. The temperature may vary at different points along the length of the oven so as to obtain optimum foaming and curing.

Referring more particularly to FIG. 3, the extruder 2, driven by the motor 3 is on a fixed axis transversely of the machine and extends to the rear end of the horizontally oscillatory conveyor 5, the driving and mounting means for which are carried by the support 7 which also carries the motor 6. Adjustable guides 29 are provided in the nip between the rollers 9 and 10 to determine the width of the calendered sheet, and these will be slidably mounted on a rod 30 extending across the machine parallel with the axis of said rollers 9 and 10.

The rollers 9, 10 and 11 are driven by a motor 31 and have slightly varying speeds as is well known in calendering practice. Any usual means for heating the rollers 9 and 10 of the mill or calendar may be provided. In FIG. 3 there are steam-entry pipes 32 at doll head bearings 33. There is means of known kind for adjusting the width of the gap or nip between the rollers according to the thickness of sheet required.

In FIG. 3 the feed hopper 1 is omitted there being shown only the entrance orifice to the extruder 2.

Referring now to FIG. 4, an additional roller 34 is provided alongside the mill roller 9 of the calender and urged against the roller 9 by the hydraulic pressure cylinders 35. A rolled supply of p.v.c. film (plain, coloured or patterned is provided) and this film is laminated against the plastic sheet 12 by passage between the rollers 9 and 34. The film 36 is thus caused to adhere temporarily to the unblown p.v.c. material 12 and, after the p.v.c. web has been laminated with the textile carrier as above described the whole is taken into the oven 22 where the heat of the oven causes the applied p.v.c. film to become permanently attached to the underlying p.v.c. web as the latter is blown and cured. Before the laminations enter the oven they pass under a smoothing roller 37 by which air pockets and bubbles are expelled.

The use of the roller 9 for laminating the webs 12 and 36 is a convenience, but an entirely separate pair of press rolls could be used if wanted.

The oven 12 may vary in length say from 10′ to 60′, the temperature being about 230° C. at least at the entrance end. Top and bottom heat is applied to the two layers. Instead of the gas heating shown, the bottom heat may be from a steam-heated sole plate whilst top heat is from infra-red heaters. Other forms of heating may also be used. As the cured blown material leaves the oven in the form of a firm foamed sheet, it is passed under a smoothing roller 38, which when the applied skin 36 is not present, may be a cooled roller to effect a chilling and skinning of the foamed material.

The form of design or pattern and the number of colours involved in the applied sheet 36 is limitless. Also the thickness of the applied top sheet or film 36 may vary according to whether a hard surface or a soft flexible surface is to be paramount.

The improved material may be used in hospitals, ships and the like where silence is desirable, because of its resilience and sound absorbing qualities. It may be used for such articles as bath mats, and the like where waterproofness and washability is important. In all these and other cases the material may be with or without the fabric base.

The top surface, when provided by the attached layer or film 36 will be of more hard wearing material than the foamed material and will therefore give long life to the applied pattern, etc. Amongst other things, patterns resembling those of inlaid linoleum materials may be produced on the foam sheeting. Also so-called leather-cloth designs may be produced. Any form of embossment may be included in the preparation of the applied film or sheet.

In a more simple form of carrying out the invention, the unblown p.v.c. sheet is given a mottled, jaspé or like effect by the addition of pigments to the mix at a suitable stage or stages in its preparation before it is fed to the extruder 2, and this effect becomes fixed during the blowing of the sheet to give a decorative surface, though this will not be so hard wearing as when the applied film 36 is present. Such ornamental material could however be covered by a transparent p.v.c. film so as to combine wear resistance with ornamentation.

Where p.v.c. is referred to herein, any other single polymers or co-polymers may be submitted when desired.

The machine will include a control panel and instruments for regulating speeds and temperatures at the various operating points so as to synchronise the extruder, calender and oven with each other.

What we claim is:
1. Apparatus for making a foamed sheet of plastic material in continuous form comprising an extruder for said plastic mixed with a foaming agent, a feed conveyor below said extruder for deposit of said plastic, a pair of horizontal calendar rolls, the nip of which is below the discharge end of said conveyor, means for oscillating said feed conveyor to discharge said plastic across said nip, a curing oven having an endless conveyor passing therethrough, said endless conveyor being adapted to support a carrier web, and means for feeding said plastic from said rolls onto the top of said carrier web to permit foaming of said plastic in said oven.

2. Apparatus according to claim 1 characterized in that said endless conveyor is a wire mesh belt.

3. Apparatus according to claim 1 characterized in that a discharge conveyor is located at the discharge end of said oven.

4. Apparatus according to claim 1 characterized in that there is provided means for feeding a textile web onto said endless conveyor under said calendared plastic. calendar and oven with each other.

5. Apparatus according to claim 1 characterized in that means are provided for limiting the arc of oscillation of said feed conveyor.

6. Apparatus according to claim 1 characterized in that there is provided means for feeding a film of plastic onto the upper face of said calendared plastic.

7. Apparatus according to claim 6 characterized in that means are provided for pressing said film against said calendared plastic to form a laminate.

8. Apparatus according to claim 1, having means for feeding a continuous film of polyvinyl chloride on to the top of said plastic material before it is taken by the conveyor to said oven, and means for expelling air from between said film and material before entry into the oven.

References Cited by the Examiner

UNITED STATES PATENTS

| | | | |
|---|---|---|---|
| 2,383,598 | 8/45 | Glidden | 156—500 |
| 2,771,388 | 11/56 | Rocky et al. | 154—102 |
| 2,801,949 | 8/57 | Bateman | 154—120 |
| 2,810,423 | 10/57 | Longstreth et al. | 154—1 |
| 2,823,156 | 2/58 | Hedges | 154—46 |
| 2,894,855 | 7/59 | Wilhelm et al. | |
| 2,944,586 | 7/60 | Yanulis | 154—1 |
| 2,964,799 | 12/60 | Roggi et al. | 156—79 |

EARL M. BERGERT, *Primary Examiner*.

CARL F. KRAFFT, *Examiner*.